(12) United States Patent
Cutler

(10) Patent No.: US 8,281,795 B2
(45) Date of Patent: Oct. 9, 2012

(54) RETRACTABLE AWNING

(76) Inventor: Daniel Cutler, Geneva (CH)

(*) Notice: Subject to any disclaimer, the term of this patent is extended or adjusted under 35 U.S.C. 154(b) by 418 days.

(21) Appl. No.: 12/525,684

(22) PCT Filed: Feb. 20, 2008

(86) PCT No.: PCT/GB2008/000595
§ 371 (c)(1),
(2), (4) Date: Aug. 4, 2009

(87) PCT Pub. No.: WO2008/102141
PCT Pub. Date: Aug. 28, 2008

(65) Prior Publication Data
US 2010/0126543 A1   May 27, 2010

(30) Foreign Application Priority Data
Feb. 20, 2007 (GB) .................................. 0703285.7

(51) Int. Cl.
*E04H 15/58* (2006.01)
*E04F 10/06* (2006.01)

(52) U.S. Cl. ..................... 135/117; 135/88.12; 135/905; 160/7; 160/66; 52/74; 52/63

(58) Field of Classification Search ............... 135/88.1, 135/88.11, 88.12, 96, 117, 120.4, 123, 905, 135/907; 160/7, 22, 45, 66–69, 75, 405; 52/73, 74, 63, 86, 222; 296/163, 100.12, 296/105
See application file for complete search history.

(56) References Cited

U.S. PATENT DOCUMENTS

| 4,390,054 | A | * | 6/1983 | Niibori et al. ................. 160/265 |
| 4,444,363 | A | | 4/1984 | Jacquel et al. |
| 4,494,707 | A | * | 1/1985 | Niibori et al. .............. 242/390.2 |
| 4,955,092 | A | | 9/1990 | Hagan |
| 5,259,432 | A | * | 11/1993 | Danieli ........................... 160/66 |
| 5,547,009 | A | | 8/1996 | Plumer |
| 5,947,544 | A | * | 9/1999 | Hubeshi ...................... 296/97.4 |
| 6,431,488 | B1 | | 8/2002 | Zemla et al. |
| 6,732,018 | B2 | * | 5/2004 | Osinga ......................... 700/275 |
| 6,755,230 | B2 | * | 6/2004 | Ulatowski et al. ......... 160/84.02 |
| 6,834,705 | B2 | * | 12/2004 | Seel ......................... 160/370.22 |
| 7,129,657 | B2 | * | 10/2006 | Cavarec et al. ............... 318/280 |
| 7,152,652 | B2 | * | 12/2006 | Heitel ............................... 160/5 |
| 2001/0035204 | A1 | * | 11/2001 | Lin ................................. 135/87 |

FOREIGN PATENT DOCUMENTS

| EP | 0645518 | 3/1995 |
| EP | 1113120 | 7/2001 |
| FR | 2502597 | 1/1982 |
| FR | 2678019 | 6/1991 |
| FR | 2723760 | 2/1996 |
| JP | 9-112161 | 4/1997 |
| WO | 2006/067440 A2 | 6/2006 |

* cited by examiner

*Primary Examiner* — Winnie Yip
(74) *Attorney, Agent, or Firm* — Sutherland Asbill & Brennan LLP

(57) ABSTRACT

A retractable awning, comprising a screen which may be extended and retracted, wherein there is provided a first motor arranged to extend the screen, a second motor arranged to retract the screen, and a control unit arranged to control the first and second motors, wherein the first and second motors are synchronized so as to maintain tension in the screen within predetermined values.

23 Claims, 10 Drawing Sheets

RETRACTABLE AWNING

TECHNICAL FIELD

The present invention relates to a retractable covering apparatus such as a canopy or awning, having a control unit for controlling the extension and retraction thereof. The invention also extends to a control system for such an apparatus, and a method for operating a covering apparatus.

BACKGROUND OF THE INVENTION

Awnings or canopies are often used for example outside restaurants or in private gardens to cover open areas and provide shelter for the people underneath them, thereby providing sun protection, rain protection or the like. A variety of covering apparatuses are known in the art. For example some canopies are provided on the side of a building, with folding arms which can be extended out from the building when the canopy is to be deployed. Other covering systems have a covering screen attached to moveable wires that are operated to extend or retract the screen.

It is desirable for canopies and awnings to be easily extended and retracted, whilst at the same time, the extended canopy must be strong enough to resist wind loading, etc. A major problem with all of these types of covering is providing sufficient tension in the screen so that the canopy does not sway unduly or flap in the wind. In the past, tension has typically been provided by means of springs so that as the screen is extended further, more tension is applied by the springs. However, the limit of tension which can be provided by springs is fairly low and varies with the length of the screen which has been extended. Also, springs lose their elasticity over time or if they are extended too far. This limit of tension has been a major factor in limiting the size (both width and length) of such covering systems. However, large covering systems are desirable for many applications, such as providing rain and sun protection over large patios, tennis courts or swimming pools and allowing them to be used or enjoyed in comfort.

The present inventor's earlier patent application, GB2421522, discloses a new type of covering system whereby a leading portion of a retractable screen is mounted to a number of longitudinal wires via clamping systems releaseably attached to the wires. In order to extend the screen, the clamping systems are released and pulled along the wires, thereby extending the screen with respect to the wires. When the screen has been deployed to the desired position, the clamping systems are clamped to the wires thereby maintaining the screen in the extended position under tension. Further tension can be applied by e.g. drawing back the trailing portion of the screen in the direction of retraction. Thus tension can be readily applied to the screen, and is limited only by the strength of the clamping system, the wires and the screen itself as opposed to springs as in the prior art. As such, this system enables large covers to be deployed under higher tensions.

It is disclosed in GB2421522 that the clamping systems and also the storage roller on which the screen is stored can be motorised in order to enable automatic deployment. However, the clamping systems will be subject to external forces such as wind, and other obstacles to movement such as debris on the tensile wires. The forces acting on each clamping unit may differ, thus causing them to move at different speeds despite having equal drive applied by the motors. Furthermore, the clamping systems can slip along wires (e.g. if they are wet or greasy), again, in a non-equal fashion. Also the motors may provide different drive forces, for example due to manufacturing tolerances or, variations in the power supply may cause one motor to pull momentarily stronger or to suffer a lull. A gust of wind on one side can cause a drag on one motor and a difference in elasticity in the fabric of the screen from one side to the other can cause different forces to be applied to motors on different sides of the screen. This can cause unbalanced pulling forces to be applied to the screen which can consequently be deployed and retracted in a lop-sided fashion. Not only does this make the screen less effective, but it can damage the screen. These drawbacks will be particularly pronounced with larger screens where the clamping units have to travel greater distances and support heavier weights. In addition, in the case where no motor is provided for retraction, in order to retract the canopy it is necessary to provide for example a spring biasing mechanism. Where a large canopy is involved, a significant retraction force is required which can be difficult to provide.

When retracting the screen with unbalanced forces at either side of the screen, there is a further problem; with the unequal forces, the screen can become skewed and as it is retracted onto the storage roller, the screen may not roll up straight. In other words, as the screen is wound onto the storage roller, it may drift laterally one way or the other along the roller. In such cases, as the screen is rolled up, it is displaced gradually further and further along the storage roller in the axial direction. Also uneven pulling can lead to wrinkles forming in the screen. As these wrinkles are wound onto the screen, they become folds and creases in the fabric. Such wrinkles and creases create weaknesses in the fabric of the screen. Under the high tensions involved in such canopies, there is a greatly increased chance of the fabric tearing at such weaknesses. Once such distortions have manifested in the screen, they can persist indefinitely and become aggravated each time the awning is deployed and retracted.

Once the screen has been deployed, even when the clamps are clamped in place, external forces such as wind can still cause them to move, thus resulting in a loss in tension or an uneven tension in the screen. As the screen is raised significantly above the ground, wind passes both over and underneath the screen and the screen can easily catch the wind and experience high forces.

SUMMARY OF THE INVENTION

According to one aspect of the invention there is provided a retractable covering apparatus, comprising a screen which may be extended and retracted, wherein there is provided a first motor arranged to extend the screen, a second motor arranged to retract the screen, and a control unit arranged to control the first and second motors.

Thus, by means of the invention the first motor need only apply sufficient torque to extend the screen and the second motor need only apply sufficient torque to retract it.

In an alternative aspect the first motor is attached to the screen.

Although the non-driving motor could be allowed to freewheel, preferably both motors remain engaged during extension and retraction. In this way they may be controlled to prevent sagging of the screen during extension or retraction. Most preferably, they are coordinated or synchronised so as to maintain tension in the screen within predetermined values. This may be achieved by controlling the motors such that a predetermined degree of stretch is applied to the screen. By coordinated or synchronised, we mean that the motors are operated so that they maintain even tension in the screen. If a discrepancy is detected, the speed of one or more of the motors may be adjusted in order to compensate and bring the tension back into line.

As discussed above, if the correct tension is not maintained in the screen, creases and folds may develop which are problematic when rolling or unrolling the screen from the storage roller. The severity of such problems depends upon the size of the screen. With small canopies such as are known in the prior art, the screens are not so large that creases in the canopy are a severe problem. However, with the much larger screens to which this invention applies, there is a much larger quantity of screen fabric to roll up and a much higher tension must be applied to the screen during deployment and retraction. Small variations in tension are amplified and the effects are far more severe, and therefore it is much more important in larger canopies not only to ensure that tension is applied and maintained throughout deployment and retraction, but also to ensure that the tension is applied evenly to both sides of the screen.

The covering apparatus is preferably an awning or canopy and in one preferred arrangement, the screen is arranged to extend along a plurality of tensile wires. Such arrangements have no need for a rigid longitudinal supporting framework. The weight of the screen is supported entirely by the wires. The motor is preferably arranged to drive one or more end units along one or more such wires, each end unit comprising an engaging member for moveably engaging a leading portion of the screen to a wire. In a particularly preferred embodiment each engaging member comprises at least one roller, and more preferably two rollers forming a roller system. A roller system is preferably connected to the wire by having the wire wrapped around one roller first in an anticlockwise sense and then around the second roller in a clockwise sense.

A single motor may be provided with an axle arranged to drive rollers on a plurality of wires. This motor may drive the rollers independently at different speeds via a differential gearing mechanism.

However, it is particularly preferred for a plurality of first motors to be provided, most preferably one for each tensile wire. Generally a motor operating an end unit will be arranged with the end unit and move therewith.

In an alternative embodiment of the invention, the screen is deployed by means of tensile wires connected at one end to the front (leading edge) corners of the screen and at the other end to supports, e.g. supporting poles. These tensile wires are splayed apart so that they become further apart in the direction of extension of the screen. In this embodiment, motors are provided in the region of the supports to drive winches which wind in the tensile wires, thus drawing the screen out in the direction of extension. Although one motor could be provided to drive two winches at different speeds via a differential gearing mechanism, preferably separate motors are provided, one for each tensile wire.

The motors are preferably arranged so that they can be operated at different speeds and/or torques from each other and be independently controlled. In one embodiment, one first motor is a master and other first motors are slaved to it. Thus, the control unit may directly control the second motor and one first motor, and further comprise a local master control unit associated with the first ("master") motor that controls further first ("slave") motors. Preferably the control unit further comprises a slave local control unit associated with each slave motor for communicating with the local master control unit and controlling motion in response to commands therefrom. The control unit may be considered a control system comprising a main motion control unit for controlling the second motor, and local master/slave control units.

In another embodiment, there may be no master/slave relationships and all the motors are controlled directly by the control unit (i.e. at the same hierarchical level). Each motor is communicatively coupled to the control unit for receiving control signals therefrom.

In a most typical arrangement of the invention there will be provided an extendible canopy disposed on a storage roller (e.g. a cylindrical shaft) for extension via tensile wires. The distal end of the canopy will preferably be provided with at least a pair of motors arranged to extend the canopy. As described above, these motors may be arranged to extend the canopy along fixed wires or may be arranged to extend the canopy by reeling in the wires. The storage roller may be provided with a further motor arranged to turn the storage roller and retract the canopy. A control unit may control the storage roller motor and at least one of the canopy motors (e.g. a master motor) such that a pre-determined degree of stretch is maintained in the canopy as it is extended and retracted. The other canopy motor(s) (i.e. slave motor(s)) may adjust their position relative to the one controlled by the control unit. However, preferably each motor individually communicates with and is controlled by the main control unit.

The control unit of the invention also preferably comprises an interface to allow a conventional awning controller (of the type designed for controlling a single motor) to be used to control the apparatus of the invention. For example, a user may input an 'open' or 'close' command using such a conventional controller, perhaps by remote control.

As described above, in one embodiment each canopy motor (first motor) drives an end unit along an elongate member, preferably an elongate flexible wire. The local master control unit of the master motor may calculate an error between the desired position and a measured position of the end unit associated therewith, and may use this to control the motion of the master motor. For example the local control unit keeps the end unit moving until the measured position reaches the desired position. The motion, and thereby the position and/or velocity of the canopy motors are preferably monitored by rotary encoders. A rotary encoder may also be associated with the storage roller in order to monitor the motion thereof, and thereby the amount of screen which has been payed out or retracted. The control unit will usually advise the local control unit of the master motor of the desired position, which will be for example the extended position or home position.

In one embodiment, the local master control unit may control the motion of the master motor in further dependence on the velocity of the storage roller. For example the maximum velocity of the master motor during extension may be set at the velocity of the storage roller. This ensures that the canopy motors do not move quicker than the screen is being payed out. The velocity is preferably maintained (by providing appropriate current to the canopy motors) in order to maintain the desired tension in the screen.

As mentioned above, the other canopy motors may adjust their position relative to the master motor. This means that the motion of the motors is synchronised (coordinated) and thus the canopy is extended and retracted in a balanced fashion. This may be effected by each of the end units monitoring their position (e.g. using rotary encoders), and the master local controller evaluating these positions against the expected position. If the position error exceeds a certain value, then the velocity of one or more motors is adjusted to compensate for the error. The position error may also be monitored and corrected when the end units are stationary (e.g. when the canopy is extended) to ensure that tension is not lost.

Alternatively, all end units may communicate directly with the main control unit. Each end unit is therefore communicatively coupled with the control unit so that it can both send and receive signals. For example each end unit may be arranged to send its position to the control unit and each end unit may be arranged to receive drive commands from the control unit. Similarly the retraction unit may be arranged to communicate to the control unit how much screen is payed out and may be arranged to receive commands to pay out or retract the screen. The control unit monitors and processes all of this information from the storage units and end units and sends out commands to each unit in order to balance the tension in the screen.

The position of the screen can be monitored by means of rotary encoders as described above. However, it may also be monitored by other means such as by optical distance measuring (e.g. with a laser). Most preferably, the tension in the screen is monitored by means of a tension meter (e.g. a load cell). Preferably tension meters are arranged at either side of the screen so as to monitor the tension being applied at both sides. The tension meter(s) can be positioned in a number of different places. They may be located at the point of attachment to the screen. If the motors are provided on end units which drive the screen along tensile wires, the tension meter(s) may be incorporated into the end units. If the motors are provided adjacent to the end supports, the tension meter may be positioned between the tensile wire and the screen. However, preferably the tension meter is not connected to the tensile wire or to the screen, but is connected to the end supports. As the tension in the screen varies, so does the load applied to the end supports. By monitoring the amount of load on the end supports, the amount of tension in the screen can be deduced. Positioning the tension meter in this way has the advantage that the tension meter does not move as the screen is deployed and retracted. Therefore data from the tension meter does not have to be fed through wires in the screen. Instead, the data can be communicated back to the control unit either by overhead wires, or more preferably underground wires. The control unit may control the motors in accordance with the sensed tension in order to keep the screen under appropriate tension during extension and retraction. In some embodiments, a tension meter may be employed in addition to detecting the velocity/position of the screen deployment.

Preferably a limit switch is associated with at least one of the end units for detecting when the end unit bumps into something. This may comprise a bidirectional 'bumper' and a microswitch. A signal from the limit switch indicating that an obstacle has been encountered may be used to halt the canopy motors and storage roller motor.

The motors preferably use a worm gear arrangement whereby the motor can move the canopy, but tension applied to the canopy cannot cause the motors to turn. Thus, the canopy may only be extended and retracted by control of each motor, thereby ensuring that the correct tension can be maintained.

Viewed from another aspect, the invention provides a canopy or awning comprising an extendible cover which may be extended and retracted, wherein at least one motor is provided to drive the distal end of the cover to extend the canopy, and a further motor is provided to retract the canopy. One of the drive motors may control another in a master-slave relationship.

The control arrangement of the invention and its preferred forms may be retro-fitted to existing covering systems, and therefore the invention also extends to a control system for use in a covering system. Thus, viewed from a further aspect the invention provides a control system for controlling extension and retraction in a retractable covering apparatus, wherein the control system comprises: inputs for receiving position and/or velocity and/or tension information from an end unit of the covering apparatus and from a retraction unit; and an output for providing control signals to a motor for driving the end unit and for driving a motor in the retraction unit; whereby tension in the screen is maintained in a predetermined range during extension and/or retraction.

Preferably further end units may be provided. A further motor may be provided to drive each end unit. As noted above, though these may be directly controlled by a single control unit. They may alternatively be slaved from a first drive motor.

Thus, the control system of the present invention ensures that the end units are driven in a synchronous fashion, by monitoring information related to the position/velocity of the end units or the tension in the screen and controlling the end units accordingly. The position/velocity information is related to the tension in the screen. Thus an appropriate tension can be maintained during extension/retraction by monitoring the position/velocity/tension and adjusting the motion accordingly. As mentioned previously, a tension meter can be used to provide the tension information.

In a deployed state, if an end unit moves so that tension is reduced, the control system will output an appropriate control signal to that end unit driving motor to drive the end unit back to the correct position so that tension is returned.

In yet a further aspect, the invention provides a method of operating a retractable covering apparatus as described above. Such a method may broadly comprise the steps of operating a first motor to extend the screen; and operating a second motor to retract the screen; further comprising operating a control unit to control the first and second motors.

In any of the above described covering apparatuses, a further way of increasing the tension in the screen during deployment is to introduce a difference in height in the end points of the screen, i.e. a transverse difference in height between the sides of the screen. If the end points of the screen are support poles, this may be achieved by making one support pole higher than the other. If the end points are fixed to a wall, the end points may be fixed at different heights on the wall.

With such a transverse difference in height of the end points, as the screen is extended, the screen is caused to tilt away from the horizontal. At the same time, as the screen is extended further, an increasingly greater transverse tension is applied to the screen. This balances the increasing need for tension as the screen is extended due to the increased weight of fabric and the increased susceptibility to external forces, e.g. from wind.

A further advantage of this difference in height is that as the screen is tilted away from the horizontal, a natural drainage path is created towards the lower end point. With large canopies, drainage can be a serious problem as water tends to pool on the canopy causing it to sag, which can in turn lead to accumulation of more water. If too much water is accumulated on the screen, the screen can be damaged. Smaller canopies which do not span a great length do not have such a problem with drainage as they can extend the screen at a steep enough angle to the horizontal that the rain will easily drain off the front of the screen: It is also easier with a smaller span to provide the tension required to prevent sagging of the screen at that angle. However, with larger screens, spanning a greater length, the angle of the screen cannot be made too steep without either raising the rear end of the screen or lowering the front end of the screen by excessive amounts. Also, the tension required to maintain a large screen sufficiently taut at such a reduced angle is prohibitively large. Therefore, providing a drainage route by angling the front of the screen to one side provides a much better solution for larger canopies.

It will be apparent that features described above in relation to a covering apparatus may be equally applicable to the control system or method, and vice versa.

In this description, references to elongate wires or tensile wires are intended to encompass cables or ropes of sufficient strength to support the screen and withstand the necessary tensioning forces.

These and other features of the present application will become apparent to one of ordinary skill in the art upon review of the following detailed description when taken in conjunction with the drawings and appended claims.

BRIEF DESCRIPTION OF THE DRAWINGS

Preferred embodiments of the present invention will now be described by way of example only and with reference to the accompanying drawings, in which.

DETAILED DESCRIPTION

Figure 1:
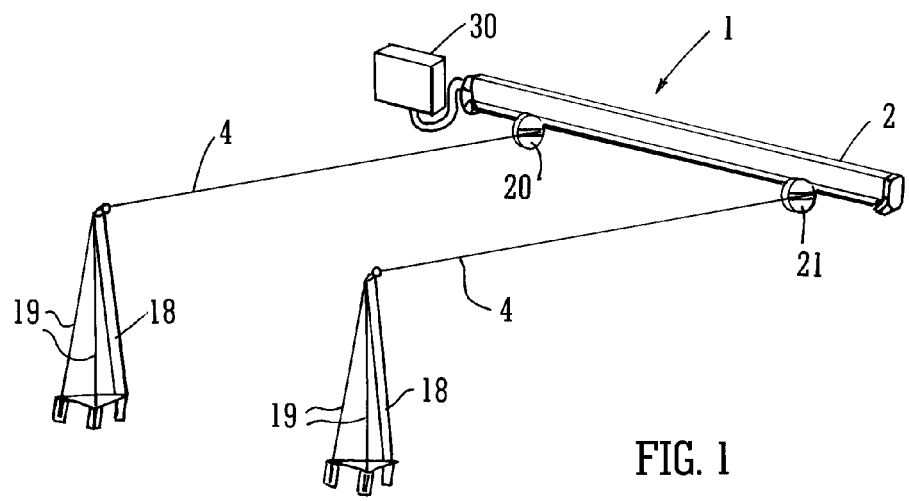
FIG. 1 illustrates a covering apparatus and control system according to an embodiment of the invention wherein the cover is in a closed position.
Figure 2:
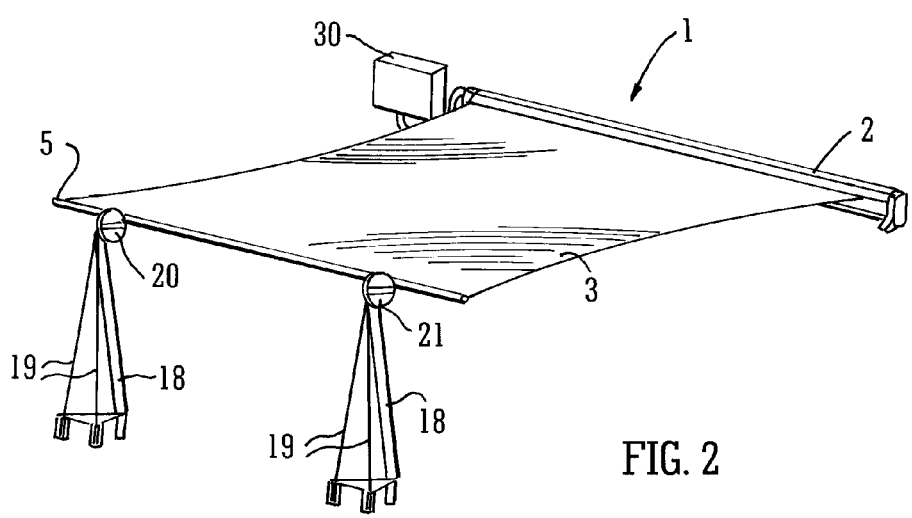
FIG. 2 illustrates a covering apparatus and control system according to an embodiment of the invention wherein the cover is in an open position.

FIGS. 1 and 2 illustrate a covering apparatus 1 in closed and open positions respectively. The covering apparatus 1 comprises a storage roller 2 at the trailing end of a screen 3. Any portion of the screen which is not deployed is rolled up on the storage roller 2 which typically takes the form of a cylindrical shaft and is typically housed in a housing. Two cables 4 which are under high tension are provided to support the deployed screen and prevent it sagging too much under its own weight. The storage roller 2 and cable ends are attached to a wall. The other end of each cable 4 is attached to a supporting pole 18 which is anchored to the ground using guy wires 19. The support pole 18 is typically embedded in the ground and is angled slightly away from the vertical in a direction substantially opposite to that in which tension is to be applied. This allows the pole 18 to withstand a greater force.

Figure 3:
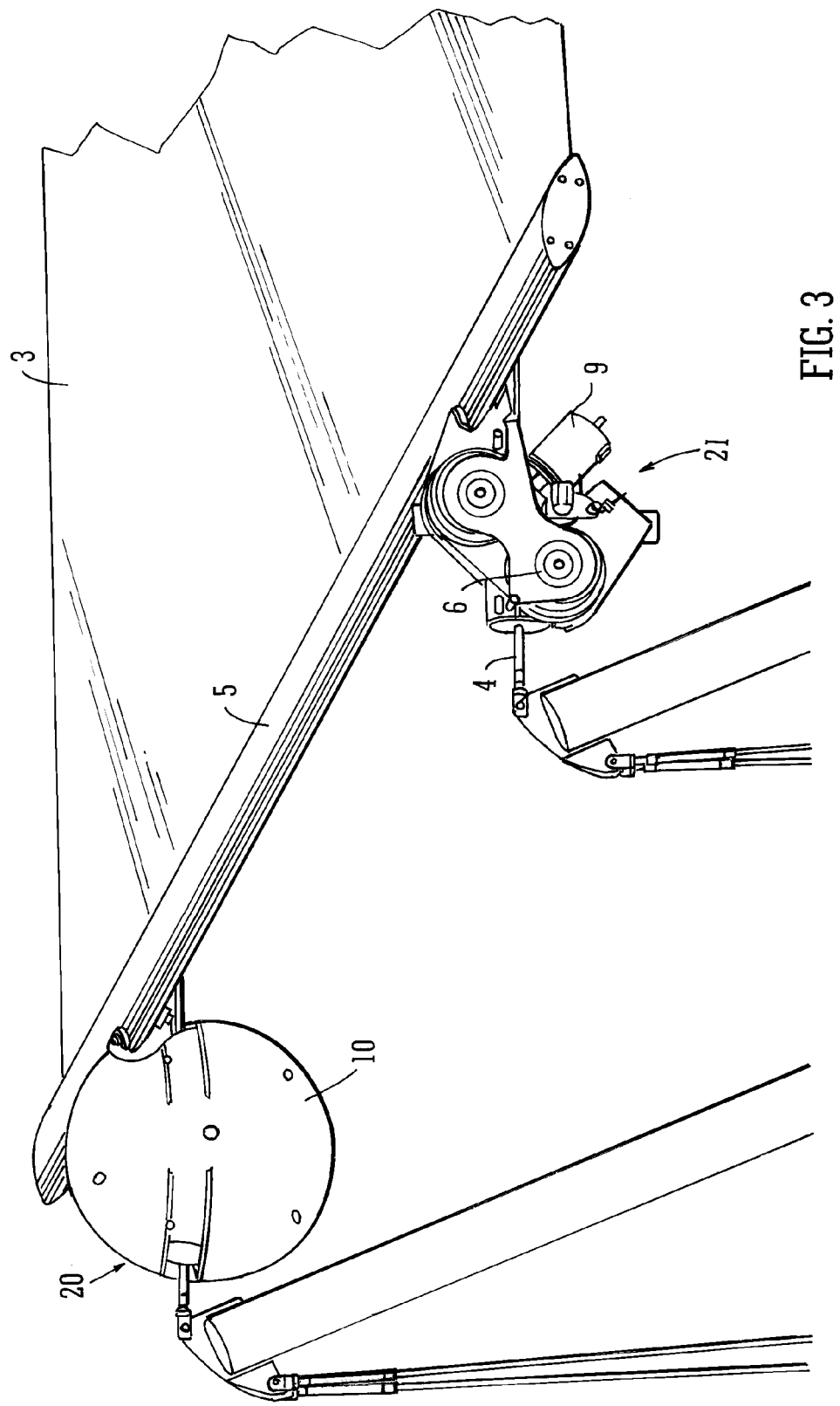
FIG. 3 is a more detailed view of the end units of the covering system.

As shown in more detail in FIG. 3, at the leading edge of the screen 3 a transverse bar 5 is attached. The transverse bar 5 provides support so as to prevent transverse sag of the screen. Two end units, master end unit 20 and slave end unit 21 are attached to the screen 3. Master end unit 20 is shown in a case 10 and slave end unit 21 is shown without a case. In use, both end units would have cases. The majority of components of the master end unit are identical to the slave end unit, and so only the slave end unit will be described here as illustrative of both. Any differences will be described later.

Figure 4:
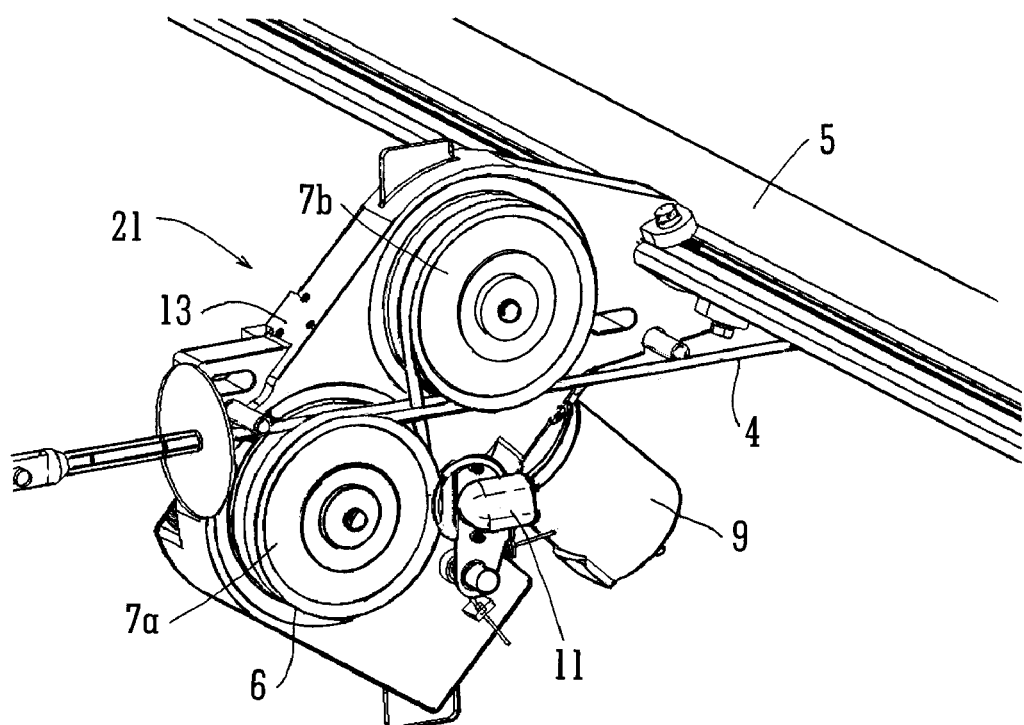
FIG. 4 illustrates the near side of a slave end unit with the case removed.
Figure 5:
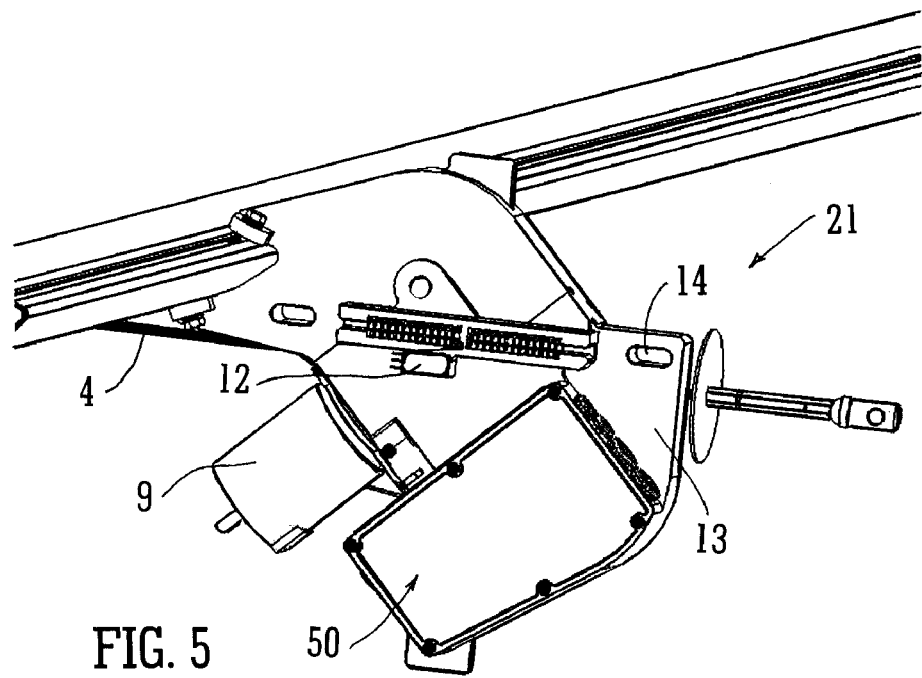
FIG. 5 illustrates the rear side of a slave end unit with the case removed.
Figure 6:
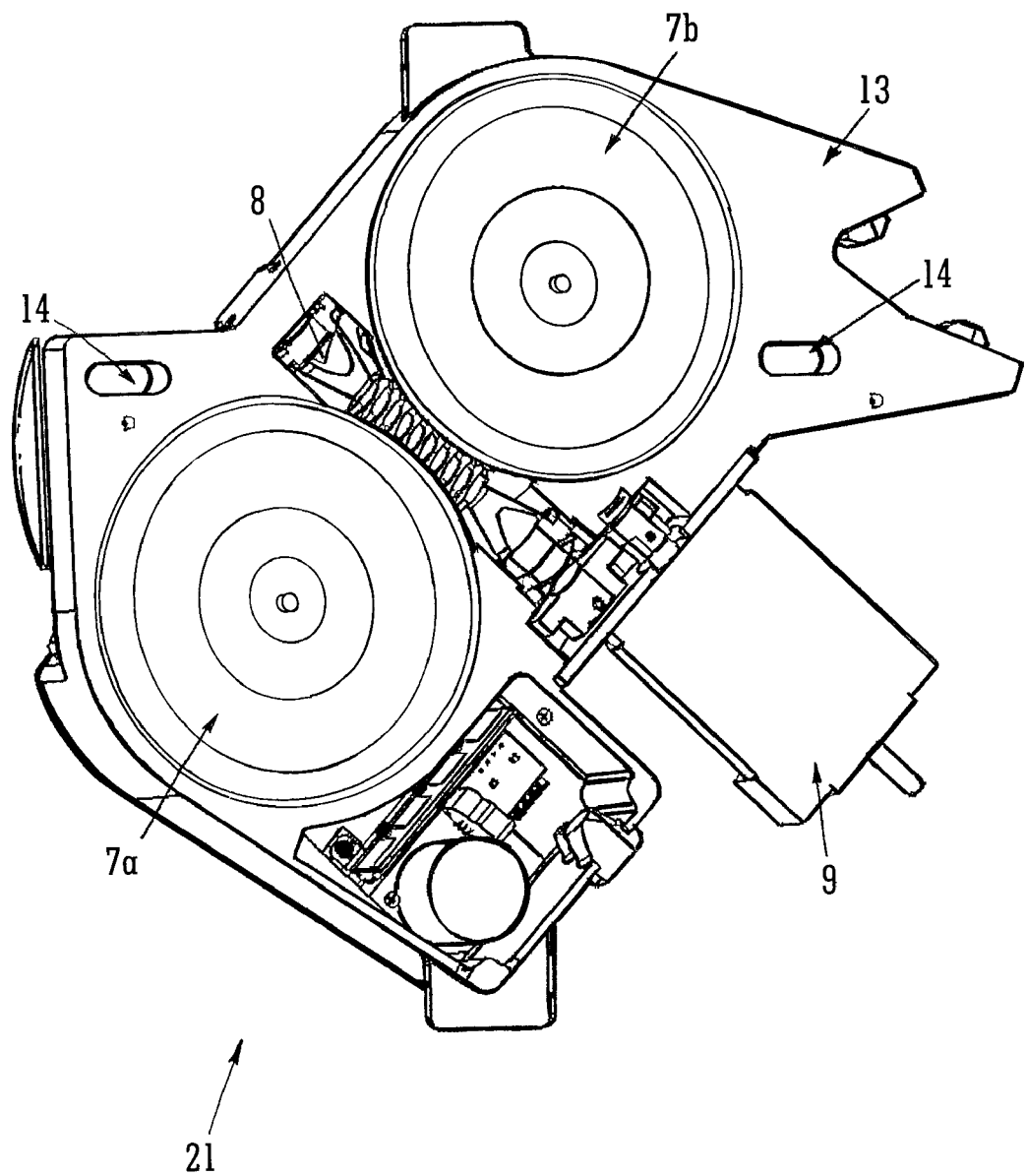
FIG. 6 is a cross-section through a slave end unit viewed from the near side.
Figure 8:
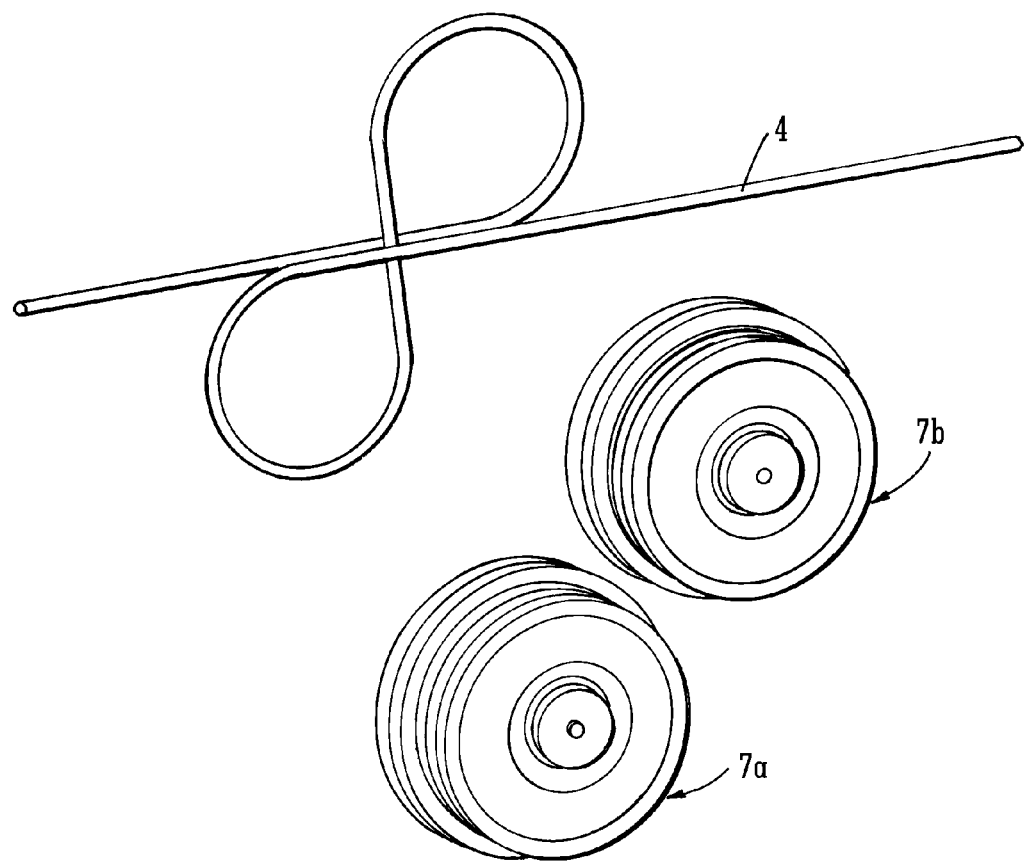
FIG. 8 is an exploded view of a roller system and cable of the end units.

The near side of the slave end unit 21 is shown in more detail in FIG. 4. The rear is shown in FIG. 5. As can be seen, slave end unit 21 is attached both to the screen 3 and to a cable 4 via a roller system 6. The roller system comprises two rollers 7a, 7b. The cable 4 is wrapped around the roller 7a in an anticlockwise sense as viewed in FIG. 8, and then in a clockwise sense around roller 7b before continuing in its original direction. Slave end unit 21 also comprises a motor 9 and worm gear 8, as can be seen in more detail in the sectional view of FIG. 6. The roller system 6 and worm gear 8 are housed inside housing 13.

The two rollers are drivable in opposite senses by the motor 9 via worm gear 8. Both rollers comprise a toothed portion (not shown) which meshes with the worm gear 8. As the rollers 7a, 7b rotate, one of the rollers (which roller depends on the direction of travel) winds cable 4 up around itself, while the other roller pays out the same amount of cable (the rollers are the same size and driven at the same speed). In this manner the rollers and hence the transverse bar 5 and the screen 3 can move longitudinally along the cables 4.

Both end units each also have a rotary encoder 11, as can be seen in FIG. 4. This comprises a rubber roller spring loaded against the cable 4, which is used to measure the distance travelled along the cable so that the position and velocity of the respective end unit can be determined.

Both end units each also comprise a limit switch 12 as shown in FIG. 5. Limit switch 12 is bolted onto the housing 13 and comprises a bidirectional 'bumper' and a micro switch. Case 10 is slidably attached to the housing 13 via slots 14 in the housing 13. When the case 10 bumps into something (e.g. the end of the cable) the housing 13 and all components attached thereto continue to move about 10 mm due to the slot connection, before stopping. This activates the bidirectional bumper of the limit switch and causes it to send a signal to a respective local controller 54, 64 of the end unit (described in more detail below with reference to FIG. 9) indicating that an obstacle has been encountered. In this way the limit switch can indicate when the cover has reached maximum open point or 'home position status' (i.e. a fully closed cover). A pre-loaded spring (not shown) is provided to return the relative positions of case 10 and housing 13 to normal.

Figure 7:
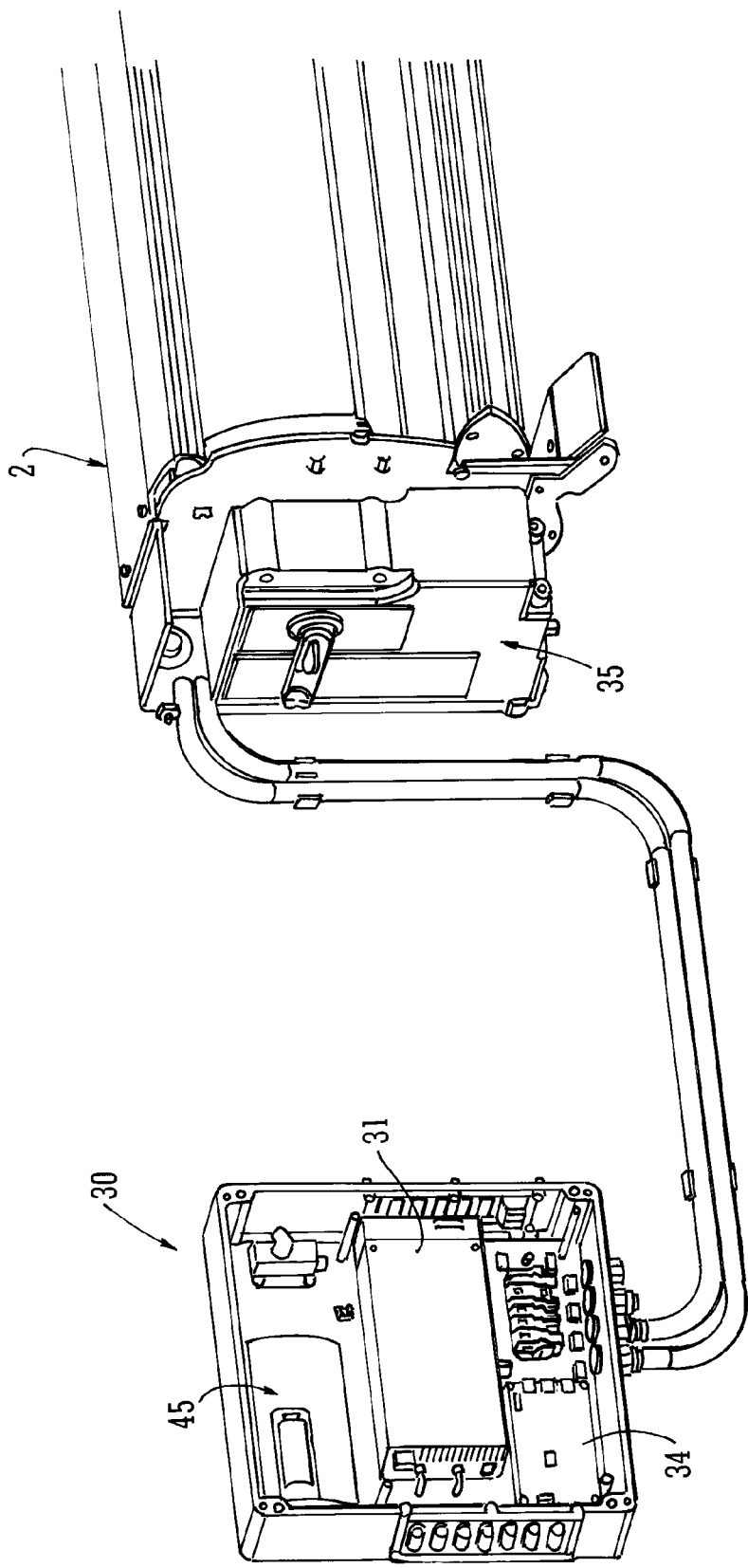
FIG. 7 is a partial cutaway view of a motion control unit and storage roller motor of the covering apparatus.

A motion control unit 30 is located on the wall adjacent the storage roller 2, as illustrated in FIG. 7. It performs the general function of providing all the necessary electrical facilities for driving and controlling the open/close motions of the screen 3, upon receiving an open/close command from a conventional awning controller 45 (indicated in FIG. 9 as 'main control unit 45'. In this embodiment, the awning controller 45 is a Simu Halcomaster 2200Pro awning controller contained within the control unit 30. (In other embodiments the controller can be any other type of standard awning controller which is designed to command known motorised awnings having non-synchronized motors, for example those made by Simu or Somfy.) The motion control unit controls the various motors in response to commands from the awning controller 45 in order to open and close the awning, whilst maintaining it at an appropriate tension.

The motion control unit 30 directly controls the stationary AC motor 35, which drives the storage roller 2. It also communicates directly with master end unit 20 in order to control the DC motor 9 on one side of the transverse bar. The master end unit 20 in turn communicates with slave end unit 21 in order to control the other DC motor 9.

Figure 9A:
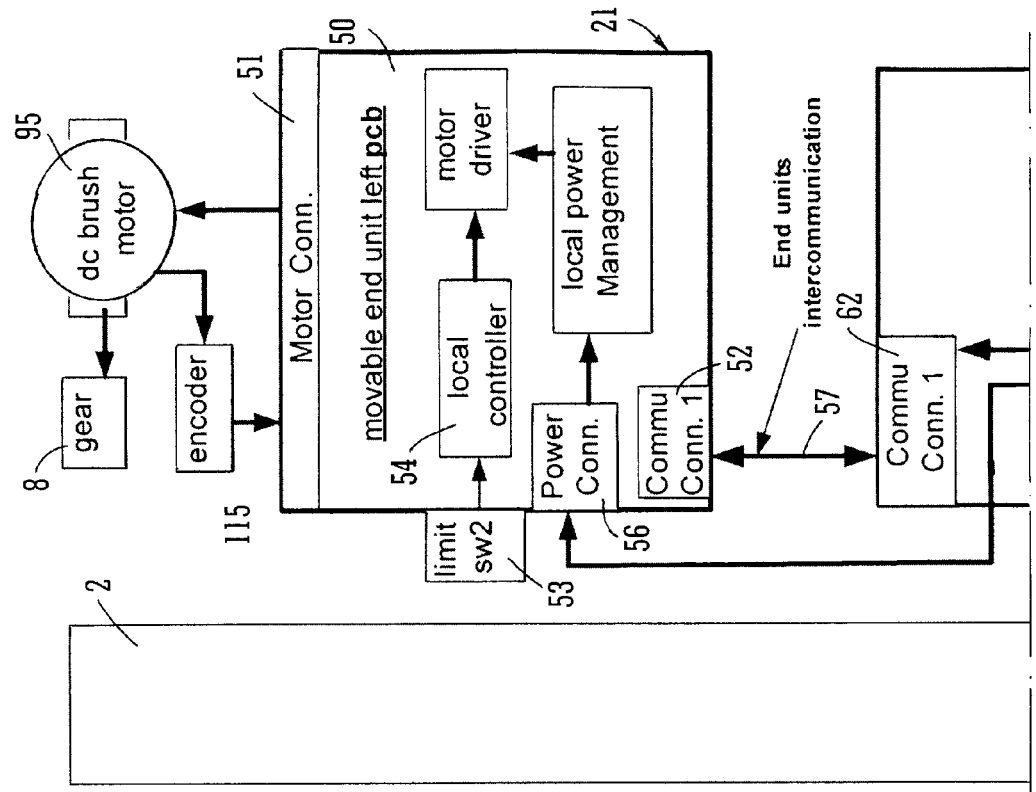
FIG. 9 is a block diagram of a control system according to an embodiment of the invention.
Figure 9B:
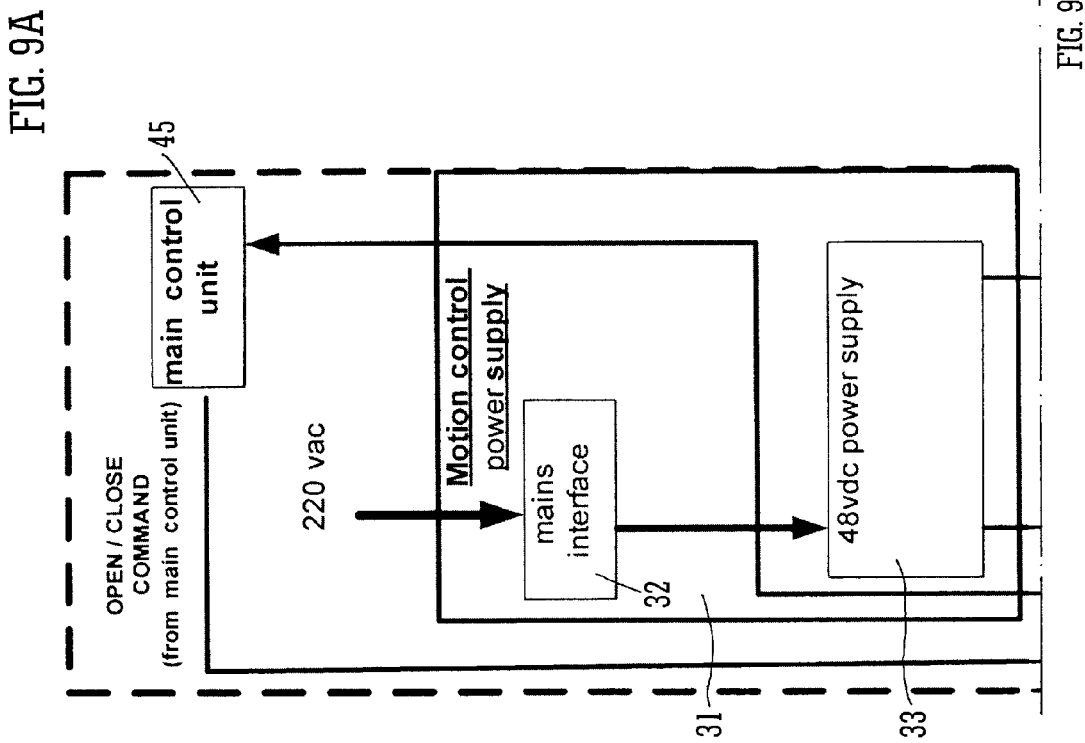
Figures 9A, 9B:
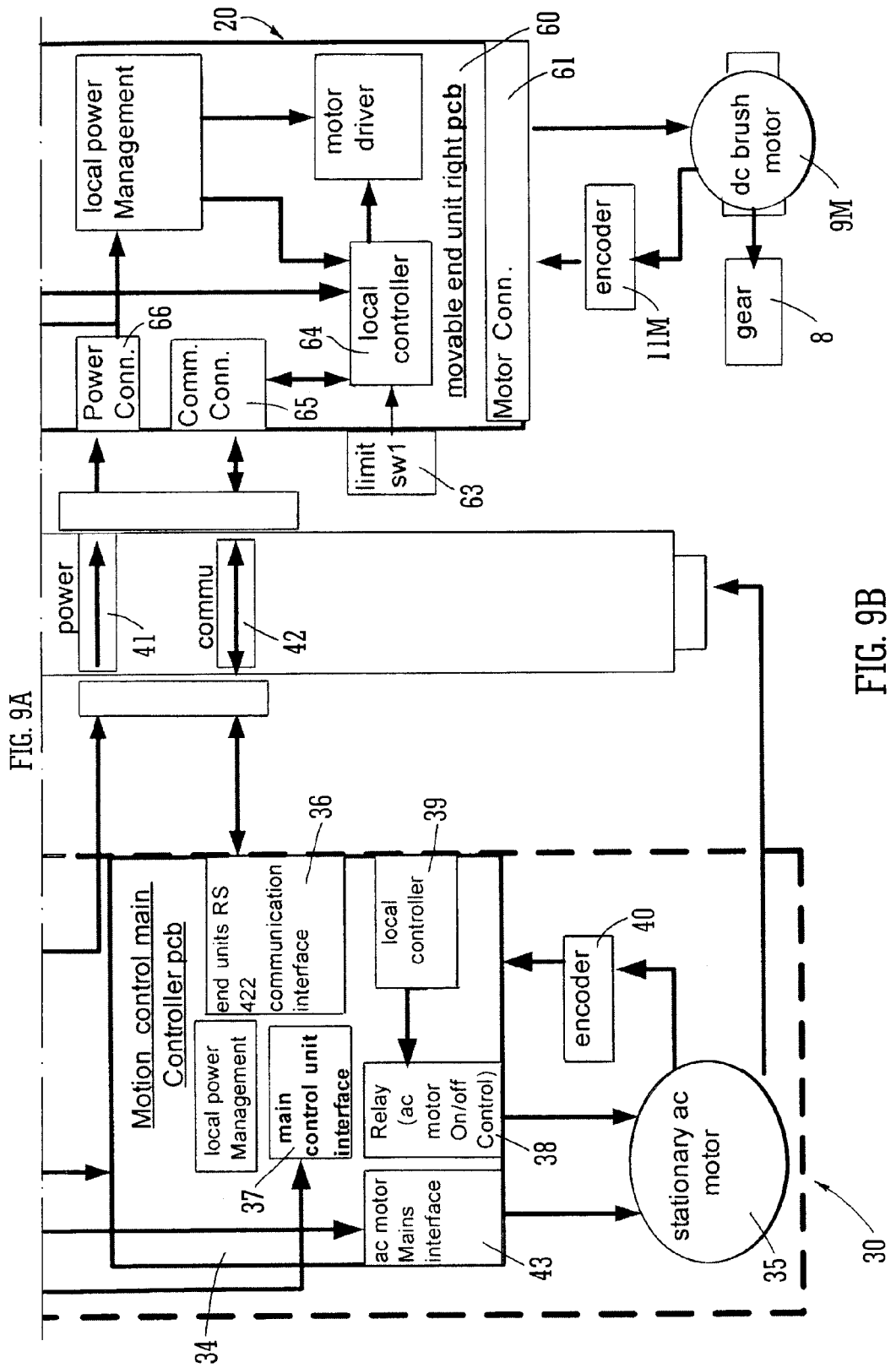

As shown in FIG. 9, the motion control unit 30 comprises a motion control power supply 31 having a mains supply interface 32 feeding a 48V DC power supply 33. This feeds a motion control PCB 34 which is part of the motion control unit and also a master end unit 20 (as described in more detail below). The power supply to the master end unit is via cable 41 which is threaded through the screen from the motion control unit 30 to the master end unit 20.

The motion control PCB 34 has a number of components for performing different functions. It receives a mains supply from the motion control power supply 31 and distributes this to stationary AC motor 35 via AC motor mains interface 43. It has a main control unit interface 37 to which awning controller 45 is connected.

The output of the controller 45 provides interface 37 with the commands 'extract', 'stop', or 'roll back'. The interface 37 translates these commands into commands for activating the stationary AC motor 35 and master/slave end units 20, 21. In this way the single motor of a standard awning arrangement is emulated so that a conventional awning controller 45, which is designed to operate a single motor arrangement, is able to operate the awning of this embodiment.

The motion control PCB 34 has a local controller 39, which receives commands from the external controller 45 via the interface 37 and controls operation of the stationary AC motor 35 via a relay. This motor is connected to the storage roller 2 such that it can rotate the storage roller 2 in order to extend or retract the cover 3.

A rotary encoder 40 is attached to the common shaft of the roller and the AC motor, in order to monitor its rotation and thereby determine how much of the cover has been extended/retracted. The result is fed back to the local controller 39 and is used in the control of the operation of the motor, as will be discussed more fully below.

The motion control PCB 34 also has a RS422 communications interface 36, which communicates with master end unit 20 via data cable 42. Data cable 42 is threaded through the screen 2 from motion control unit 30 to master end unit 20. Motion commands are deployed to the master end unit 20 via this connection together with information from rotary encoder 40 and destination position information from the controller 45.

The master end unit 20 comprises a master PCB 60. The master PCB 60 receives a 48V DC power supply from the motion control power supply 31 via cable 41 into its power connection 66, which then supplies power via a local power management unit to a motor driver and local controller 64. The motor driver then supplies power via a motor connector 61 to DC motor 9M. The power connector 66 is also connected to a power cable that supplies power to slave end unit 21 through its power connector 56.

Master PCB 60 has a master local controller 64, which manages and synchronises the motion of both end units. The master local controller 64 receives motion commands from the motion control PCB 34 through communications connector 65 and information from the rotary encoder 11M as to the motion of the end unit along the cable. It is also provided with an input from the unit's limit switch to limit switch interface 63.

It controls motor 9M (the suffixes S and M are used to indicate slave and master respectively) via the motor driver in response to these signals. It also sends appropriate motion commands to the slave end unit 21 over an RS232 communications channel via a data cable 57 and respective connections 62, 52.

Slave end unit 21 is provided with a slave PCB 50, which provides power to motor 9S via a local power management unit, motor driver and motor connector 51 in a similar manner to the master end unit 20.

The slave PCB 50 also has slave local controller 54. This receives motion commands from the master PCB 60 and controls motor 9S in response to these commands. It also receives information from the slave's rotary encoder 11S as to the motion along the cable, and from the local limit switch via limit switch interface 53.

Figure 10:
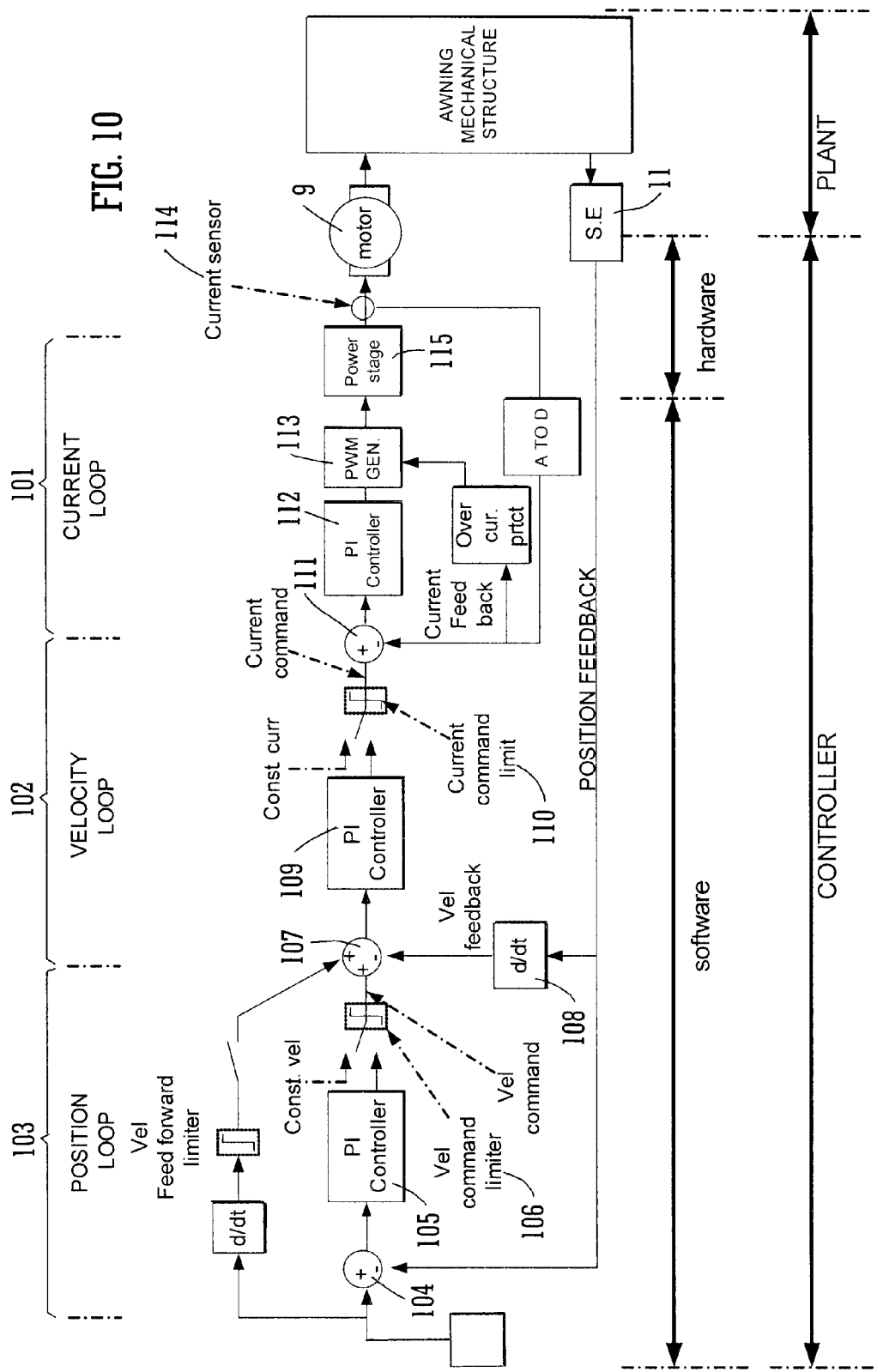
FIG. 10 is a block diagram illustrating the implementation of various modes carried out by the local controllers of the end units.

The controller 64, 54 of each end unit 20, 21, can implement a number of different modes. The implementation of these modes is illustrated in the block diagram in FIG. 10.

As may be seen, there are three basic servo loops and there is a hierarchy relationship between them. The lowest level is the current/moment loop 101, above it is the velocity loop 102 and the upper level is the position loop 103.

One mode of operation is the position mode, which is the basic mode. The local controller 64 operates the motor 9 to move the end unit to a fixed destination point along its cable 4 and keeps it stationary when it reaches that point.

In this mode, the position loop 103 first calculates the "position error" (at 104), which is the desired position ("position command") minus the position reading from encoder 11 ("position feedback"). It then uses a PI (proportional integral) algorithm 105 to feed the velocity loop with the "velocity command" required to close the position gap. The velocity command will be limited by limiter 106 if it exceeds a predetermined maximum value.

The velocity loop 102 then calculates (at 107) the "velocity error" which is the velocity command minus the velocity reading obtained by the encoder. As may be seen, velocity feedback is obtained (at 108) as d/dt of position feedback. A further PI algorithm 109 is then used to feed the current loop 101 with the current command required to reduce the velocity error. A current command limiter 110 prevents the current command from exceeding a predetermined maximum value.

The current loop 101 calculates (at 111) "current error", which is the current command minus the actual current reading from a current sensor 114, and uses a further PI algorithm 112 to control, via pulse width modulation unit 113 and power controller 115, the power transmitted to motor 9.

It will have been appreciated that while in position mode, the commands to the velocity and current loop will normally be limited to a maximum value so that there is a maximum motor velocity and moment. For example the maximum velocity may be set to the velocity of the AC storage roller motor 35.

This is the situation that applies when opening the awning. The desired position of the awning is known (e.g. fully open) and this determines the position command. During most of the travel between closed and open positions, the position error is large (because the awning is a long way from the desired fully open position) and so the value of the velocity command is constant because it is limited to the maximum velocity command. Likewise, the value of the moment command will be constant, limited to maximum moment command because the storage roller velocity cannot reach the end unit's maximum velocity.

As the end unit converges to the desired position (in this case fully open), the position error reduces, "maximum limits" are inherently deactivated, and the position loop smoothly converges to its linear mode.

When rolling back the awning 3, a variation of the above concept is used. Since the storage roller velocity is known, the desired location of the end position is dynamically calculated so as to maintain synchronization with the storage roller 2. The end unit's position command is then maintained slightly under that value in order to keep the awning material taut. Further, the coordination of the end units keeps the tension applied evenly at either side of the screen so as to ensure that creases are not formed in the screen during the rolling up process and that the screen is rolled up straight (not skewed to one side or the other).

While in position mode, the current loop command is limited to be in a range that will not force an undesired moment against the AC motor 35 beyond that required to keep the awning taut.

In this mode a "feed forward" control step can be added in which the derivative of the velocity command is calculated and sent directly to the velocity loop.

The other two modes are sub-modes of the position loop mode. In 'velocity mode', the velocity loop is provided with a direct command from the controller (as opposed to this being provided by the position loop). This mode may be used when searching for the "home" position of the awning. In 'moment/current mode', the controller provides a command directly to the current loop to directly control the torque applied by the motor.

The system can also be set to 'keep awning open'. In this situation, the master end unit 20 stays locked to the position it is in. The slave end unit 21 keeps locked to the master location. Whilst in this mode the master PCB 60 monitors its position and calculates a position error, which is the error between its position and the position it should be at. If this exceeds a predetermined value then the master PCB 60 informs the motion control PCB 34. This then initiates a new 'open cover' command so that the cover 3 is opened back out to its desired position, starting from the error point.

In use, in order to operate the covering system to extend the cover 3, a user provides an 'Open' command via (for example) a remote control of the external controller 45. The motion control PCB 34 receives the command via interface 37. In response to the command, the local controller 39 activates stationary AC motor 35 which starts to turn the storage roller 2 to roll out the cover 3. The rotary encoder 40 monitors the motion of the storage roller.

The motion control PCB 34 sends a command comprising a destination position on cable 4 to master local controller 64 of the master PCB 60 via the RS422 communications channel over cable 42. It also sends data regarding the velocity of the storage roller.

Master local controller 64 receives this data and limits the drive velocity of the roller system in accordance with this so that the storage roller and end unit velocities remain synchronised. Furthermore, the end units are arranged to apply an appropriate force so that the screen is maintained under appropriate tension. For example, the command positions and/or the velocity of the end units are calculated to maintain the desired degree of tension in the canopy.

The master local controller 64 activates the DC motor 9M via the motor driver and motor connection 61. The motor drives the roller system 6 via worm gear 8 and causes it to move along cable 4. The controller 64 is in position loop mode and therefore causes the master end unit 20 to move to its destination point, whilst limiting its own velocity and moment appropriately.

The rotary encoder 11M of the master end unit monitors how far along the cable the master end unit has travelled, and feeds this information to the master local controller. The master sends its current position and the desired velocity to the slave end unit via the communications channel over cable 57 as a position command. This information is received by the slave local controller 54, which is in position loop mode, and consequently operates its motor 9S to move the slave end unit to the same distance along its cable as the master end unit. The master end unit keeps sending its position to the slave such that the slave remains synchronised with the master.

The rotary encoder 11S of the slave end unit monitors how far along the cable the slave end unit has travelled, and feeds this information to the slave local controller which computes both current position and velocity. This information is sent to the master PCB 60 via the communications channel over cable 57. The master local controller 64 uses this information to calculate the mutual position error of the master and slave end units. It is desired that the master and slave units keep synchronised (i.e. at the same distance along the cable) so that both sides of the screen are kept under even tension. As described above, this is important for preventing creases in the screen from developing during the rolling up process and for keeping the screen straight during the rolling up process. Any errors in synchronization can lead to the formation of folds and creases or can cause the fabric to skew on the storage roller. This can damage the screen or cause problems with deployment and retraction.

If the slave end unit fails to keep synchronised, for example if a greater torque is acting on it, then the mutual position error will increase. When this surpasses a previously defined maximum, the master local controller 64 reduces the velocity of the master end unit 20 to that of the slave to prevent the mutual position error from increasing any further.

If the slave overcomes the torque obstacles, it will start to close the gap with the master end unit. The master end unit will consequently remove the velocity limit.

Once the master and slave end units 20, 21 reach the end position point dictated by the motion control PCB 34, the master unit stops moving. The slave keeps locked to the master location. The master controller 64 tells the motion control PCB 34 that the end position has been reached. This causes the local controller 39 of the motion control PCB 34 to stop the stationary AC motor 35 from paying out the cover, and reverses the direction of the motor 35 for a short time in order to stretch the cover 3 slightly. The motor is then stopped.

The master and slave end units 20, 21 then enter 'keep awning open' mode as described previously. The master end unit 20 continues to communicate with the motion control unit 30 as long as the system is 'on'. The system can be turned off at any point, but if this happens, then the master end unit will no longer be able to monitor its position error and thus ensure the screen 3 is maintained under tension.

If at any point the control system is unable to synchronise the velocities, then the system will stop and will announce an 'error mode'.

In order to retract the cover 3, a user provides a 'close' command via the external controller 45. The motion control PCB 34 receives the command via interface 37. In response to the command, the local controller 39 activates stationary AC motor 35 which starts to turn the storage roller 2 to retract the cover 3.

The motion control PCB 34 sends a 'close' command consisting of the 'home' destination position along the cable 4 to master local controller 64 of the master PCB 60 via the RS422 communications channel. Master local controller 64 also receives information regarding the velocity of the storage roller, and determines the drive velocity of the roller system in accordance with this so that the storage roller and end unit velocities remain synchronised, and so that the screen is maintained under appropriate tension during retraction.

The master local controller 64 is in position loop mode and activates the DC motor 9M via motor connection 61, which drives the roller system 6 via worm gear 8 and causes it to move along cable 4 towards the storage roller 2. It limits the velocity of the master end unit 20 in accordance with the velocity of the storage roller 2 powered by the stationary AC motor 35.

As with extension of the screen 3, the master end unit controls the travel of the end units along the cables. The rotary encoders 11 monitor how far the end units have travelled, and the master local controller 64 keeps them synchronised by monitoring and limiting the mutual position error.

Once the master and slave end units 20, 21 reach the 'home' position point dictated by the motion control PCB 34, the master unit stops moving. The slave keeps locked to the master location. The master controller 64 tells the motion control PCB 36 that the 'home' position has been reached. This causes the local controller 39 of the motion control PCB 34 to stop the stationary AC motor 35 from retracting the cover, and reverses the direction of the motor 35 for a short time in order to stretch the cover 3. The motor is then stopped. A final tensioning step is not required when the final position of the awning is the closed position.

If the limit switches 12 are activated by the end units bumping into something, then the master controller 64 halts movement of the end units. It also sends a signal to the motion control PCB 34 of the main unit to stop the AC motor rotating the storage roller. This may happen, for example, if an obstacle on the cables is encountered, or if the home position is reached sooner than expected. If a conflict arises between the position indicated by the rotary encoders and that suggested by a limit switch trigger, then the limit switch takes priority.

The above embodiment has been described with a master/slave motor arrangement. However, it will be appreciated that an alternative control system is equally applicable in which the motors in the end units and in the storage roller are all controlled directly by the main control unit. In such a system there would be no master/slave hierarchy between the motors. Instead, each motor would send data to and receive commands from the main control unit directly.

Further embodiments of the invention will now be described with reference to FIGS. 11, 12 and 13. Many elements of these further embodiments are the same as those of the first embodiment described above and will therefore not be described further.

Figure 11:
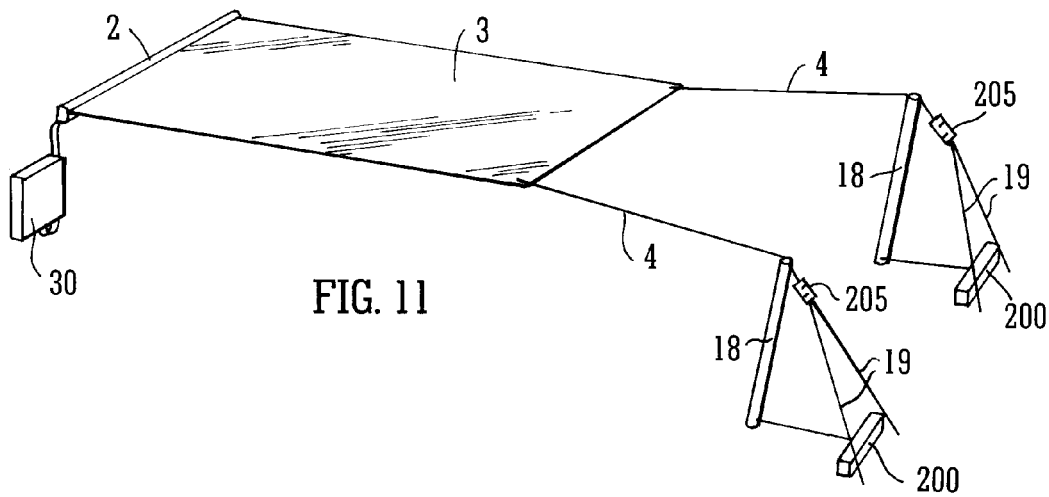
FIG. 11 shows a second embodiment of the invention.

FIG. 11 shows a second embodiment of the invention. In this embodiment the screen 3 is not deployed and retracted along fixed parallel cables 4 as in the first embodiment, but instead the cables 4 are attached at one end to the corners of the front (leading edge) of the screen 3 and at the other end are attached to winches 200. In the embodiment shown in FIG. 11, the winches 200 are located at ground level and the cables 4 are routed from the top of the support poles 18 through the inside of the poles to the bottom where they exit the poles 18 and are connected to the winches 200. Other arrangements will work equally well. The poles 18 are angled slightly from the vertical and away from the rest of the canopy (in the direction in which tension is to be applied) so that they can withstand a greater tension. The awning extended by driving the winches 200 so that the cables 4 are wound up on the winches 200 while the screen 3 is unwound from the storage roller 2, and the awning is retracted by driving the winches 200 so that the cables 4 are unwound from the winches 200 while the screen 3 is wound up on the storage roller 2. Tension in the screen is maintained by controlling the motor which drives the storage roller 2 and the motors which drive the winches 200 in the same manner as described above in relation to the first embodiment.

The motors can be arranged in a master/slave relationship, as described above. However, in this embodiment it is preferred that the motors are all individually controlled by the main control unit 30. Such an arrangement is easier to implement with this type of awning because the motors are all in fixed locations so power and data cables for connecting the control unit and the motors can be arranged either overhead or underground rather than being routed through the screen 3.

The cables 4 of this embodiment are splayed apart in the direction of extension of the screen 3. In other words, the support poles 18 are placed further apart than the width of the screen 3 so that when the cables 4 pull on the screen 3, they create both longitudinal and transverse tension in the screen 3. With this arrangement, it is not necessary to provide a rigid transverse front bar for maintaining transverse tension in the screen.

The position and velocity of the screen 3 can be monitored by means of rotary encoders in the storage roller and in the winches in the same way as in the first embodiment. FIG. 11 shows tension sensors 205 in the from of S-type load cells for monitoring the tension in the screen 3. A tension sensor 205 is placed on each side of the canopy so that the tension on both sides can be sensed simultaneously. In FIG. 11, the tension sensor 205 is positioned between the support pole 18 and the guy wires 19. As tension is applied to the screen 3, tension is also applied to the support poles 18 and to the guy wires 19. Therefore, sensing the tension in this way indirectly senses the tension in the screen 3. The advantage of this arrangement is that the tension sensor 205 remains in a fixed position and therefore data from it can easily be extracted through fixed wires.

Figure 12:
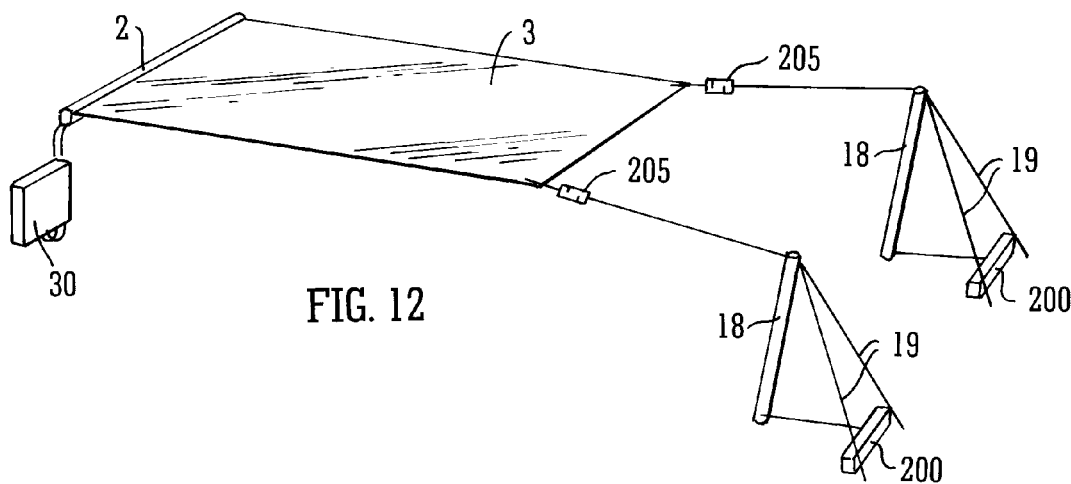
FIG. 12 shows a third embodiment of the invention.

An alternative arrangement is shown in FIG. 12. This third embodiment of the invention is the same as the second embodiment in all respects except that the tension sensors 205 are positioned between the cables 4 and the corners of the screen 3. This arrangement is less preferred than that of FIG. 11 in that the tension sensor 205 is not fixed relative to the control unit and so transferring data from the sensor to the control unit is less straightforward. However, this arrangement does provide a more direct measurement of the tension in the screen 3.

Figure 13:
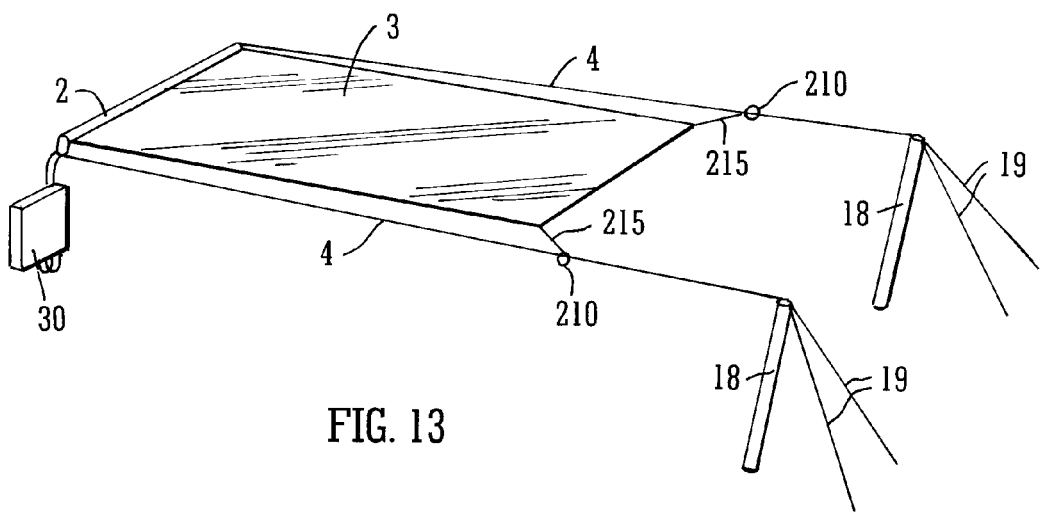
FIG. 13 shows a fourth embodiment of the invention.

FIG. 13 shows a fourth embodiment of the invention. This embodiment is similar to the first embodiment of the invention in that the screen 3 is drawn out along fixed cables 4 by means of motor-driven roller units 210 attached to those cables 4. However, in this arrangement, the cables 4 are splayed apart in the direction of extension of the screen 3 by placing the support poles 18 at the front (extension) end of the awning further apart than the attachment points of the cables 4 at the rear (retraction) end of the awning. As in the second and third embodiments, this splaying of the cables 4 creates transverse tension as well as longitudinal tension in the screen 3. The screen 3 is attached to the roller units 210 by means of short connecting wires or rods 215 so as to accommodate the changing angle (and thus the changing transverse tension) as the screen 3 is deployed. Although no tension sensor is shown in FIG. 13, a tension sensor could easily be incorporated into the connecting wires 215 or into the roller units 210 or the guy wires 19 as in the previous embodiments.

The tension sensors 205 primarily function so as to monitor the tension in the screen 3 during deployment and retraction to ensure that such deployment and retraction is well balanced, or to maintain a desired position of deployment or a desired tension in the screen 3 in the face of changing atmospheric conditions (for example the tension in the screen 3 will vary if the temperature or humidity change). However, data from the tension sensor 205 can also trigger automatic retraction of the screen 3 in certain circumstances. For example, high winds could cause an increase in the tension of the screen 3, as could accumulated snow or a fallen tree branch. If the tension sensor 205 senses that the tension has exceeded a certain threshold limit, the screen 3 can be automatically retracted so as to prevent the screen 3 from being damaged through excessive tension.

It should be apparent that the foregoing relates only to the preferred embodiments of the present application and that numerous changes and modification may be made herein by one of ordinary skill in the art without departing from the general spirit and scope of the invention as defined by the following claims and the equivalents thereof.

I claim:

1. A retractable awning, comprising a screen which may be extended and retracted, wherein there is provided a plurality of first motors arranged to extend the screen, a second motor arranged to retract the screen, and a control unit arranged to control the first motors and the second motor, wherein the first and second motors are all independently controllable and are synchronised so as to maintain tension in the screen within predetermined values.

2. A retractable awning as claimed in claim 1, further comprising a sensor for sensing tension in the screen.

3. A retractable awning as claimed in claim 2, wherein the control unit is arranged to control the motors in accordance with the sensed tension.

4. A retractable awning as claimed in claim 1, wherein the first motors are arranged to pull a leading edge of the screen and the second motor is arranged to pull a trailing edge of the screen.

5. A retractable awning as claimed in claim 1, wherein the first motors are attached to the screen.

6. A retractable awning as claimed in claim 1, wherein the screen is arranged to extend along a plurality of tensile wires.

7. A retractable awning as claimed in claim 6, wherein at least one of the motors is arranged to drive one or more end units along one or more of the tensile wires.

8. A retractable awning as claimed in claim 7, wherein each end unit comprises an engaging member for moveably engaging a leading portion of the screen to the wire.

9. A retractable awning as claimed in claim 8, wherein each engaging member comprises at least one roller.

10. A retractable awning as claimed in claim 9, wherein each engaging member comprises two rollers forming a roller system.

11. A retractable awning as claimed in claim 7, further comprising a limit switch associated with at least one of the end units for detecting when the end unit encounters an object.

12. A retractable awning as claimed in claim 7, wherein one first motor is provided for each tensile wire.

13. A retractable awning as claimed in claim 12, wherein each motor operating an end unit is arranged with the end unit and moves therewith.

14. A retractable awning as claimed in claim 1, further comprising rotary encoders arranged to monitor the motion of the motors, and thereby the position and/or velocity of the motors.

15. A retractable awning as claimed in claim 1, wherein each first motor and the second motor are arranged to maintain tension in the screen during extension and retraction.

16. A retractable awning as claimed in claim 15, wherein the control unit controls the first and second motors such that a pre-determined degree of stretch is maintained in the screen as it is extended and retracted.

17. A retractable awning as claimed in claim 1, further comprising a storage roller for storing the screen when it is not in use.

18. A retractable awning as claimed in claim 17, wherein the storage roller is driven by the second motor.

19. A retractable awning as claimed in claim 17, further comprising a rotary encoder associated with the storage roller for monitoring the motion of the storage roller.

20. A retractable awning as claimed in claim 1, further comprising an interface.

21. A canopy or awning comprising an extendible screen which may be extended and retracted, wherein a plurality of first motors are provided to extend the screen, a second motor is provided to retract the screen, and a control unit is arranged to control the first motors and the second motor, wherein the first and second motors are all independently controllable and are synchronised so as to maintain tension in the screen within predetermined values.

22. A method of operating a retractable awning comprising the steps of:
    operating a plurality of first motors to extend a screen;
    operating a second motor to retract the screen;
    wherein the plurality of first motors and the second motor are independently controlled by a control unit, and
    wherein the plurality of first motors and the second motor are synchronised so as to maintain tension in the screen within predetermined values.

23. A method as claimed in claim 22, wherein when the awning is in a deployed state and a first motor moves so that tension is reduced, the control unit outputs a control signal to drive the screen back towards the deployed state until the tension is returned.

* * * * *